Jan. 20, 1959 R. C. POMEROY 2,870,328
PROPORTIONAL AMPLITUDE DISCRIMINATOR
Filed June 12, 1953

INVENTOR
R. C. POMEROY
BY
Franklin Mohr
ATTORNEY

United States Patent Office 2,870,328
Patented Jan. 20, 1959

2,870,328

PROPORTIONAL AMPLITUDE DISCRIMINATOR

Richard C. Pomeroy, Quakertown, Pa., assignor to Bell Telephone Laboratories, Incorporated, New York, N. Y., a corporation of New York Application June 12, 1953, Serial No. 361,233

1 Claim. (Cl. 250—27)

This invention relates to devices for discriminating between electric pulses on the basis of amplitude and more particularly to such devices wherein the amplitude of an individual pulse is compared to a selected proportional part of the average amplitude of several preceding pulses in a train.

In accordance with the invention, a train of pulses is impressed upon a peak voltage measuring device which measures the average peak voltage of several preceding pulses. This average value is opposed to the instantaneous potential of each individual pulse in a circuit containing a rectifier or other unidirectional transmission device and the latter device passes only such portion of the pulse that exceeds in potential the average peak potential of the several preceding pulses.

The illustrative embodiment of the invention comprises two triode space discharge devices or twin triodes in a single envelope. A pulse train to be operated upon is impressed upon the grids of both triodes in like phase. One triode is operated as a cathode follower to provide a replica of the pulse train in its cathode resistor. The other triode has a parallel combination of a resistor and a capacitor in its cathode circuit wherein the capacitor accumulates a charge that follows the average peak potential value of several preceding pulses. A diode or other unidirectional conductor is connected serially with the cathode resistor of the cathode follower and a selected portion of the resistor in the cathode circuit of the other triode. The difference only, of the potentials in the series circuit is effective to pass a current through the unidirectional conductor thereby repeating only that portion if any of each individual pulse that exceeds in potential the selected average potential.

Figure 1:
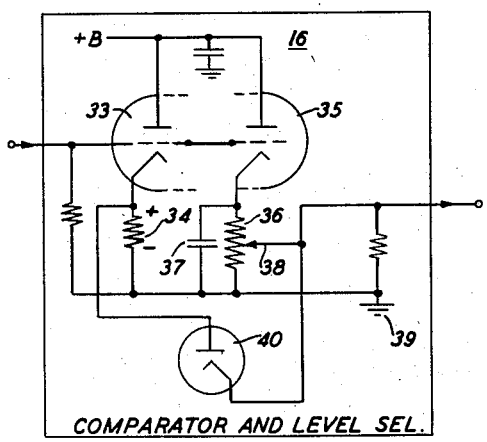
Fig. 1 is a schematic diagram of a comparator and level selector in accordance with the invention.

Referring to Fig. 1, the comparator 16 performs a continual measurement of the height of impressed pulses and compares the height of an occasional short pulse with the average height of a number of immediately preceding pulses. The comparator is set to reject any pulse that falls below a designated percentage of the average height so that such a deficient pulse will not operate the output pulse counter.

Fig. 1 shows details of a circuit suitable for the comparator 16. It comprises two space discharge devices having their anode and cathode circuits connected in parallel to each other with respect to the anode current supply circuit and having their control grids directly connected together. The space discharge devices may be the two halves of a twin triode tube. One triode, designated 33, functions as a cathode follower presenting to incoming pulses a high impedance in the control grid path and reproducing the pulses in a low impedance circuit comprising the cathode resistor 34. The other triode 35 is provided with an RC cathode path comprising a potentiometer 36 and a capacitor 37. The time constant of the RC network 36—37 is made sufficiently large so that when the capacitor 37 is charged to the full potential of the received pulses, the capacitor will retain the charge with negligible leakage through the potentiometer 36 over a period of missing pulses of a duration which is the maximum period to be expected in using the device. In the embodiment tested the time constant was sufficiently large to take care of a succession of 200 missing pulses. On the other hand, if the source of the train of pulses, which may, for example, be a magnetron is tunable and its output power is a function of the frequency generated, the potential in the network 36—37 will adjust to a new value after a predetermined time such as a few seconds, thereby making the device conveniently adaptable to variable power conditions. The slider 38 of the potentiometer 36 may be used to select any desired portion of the full potential of the potentiometer for comparison with the pulse in the resistor 34. The potentials thus to be compared are opposed to each other in a series circuit comprising the resistor 34, the portion of the potentiometer between the slider 38 and ground 39, and a unidirectional conductor shown as a diode 40. The potential across the selected portion of the potentiometer constitutes a biasing potential for the diode 40, the positive potential of the slider 38 of the potentiometer being impressed upon the cathode of the diode. The biasing potential blocks current from passing through the diode unless and until the biasing potential is exceeded by the potential developed across the resistor 34 during the transmission of a pulse. Thus it is only the portion of the pulse that exceeds the biasing potential that is passed to a utilization circuit which can be connected to the output terminal (at the right) of the comparator 16.

Figure 2:
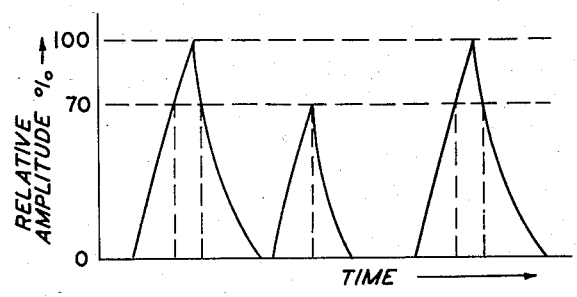
Fig. 2 is a graphical representation of an input pulse train in a comparator as shown in Fig. 1.
Figure 3:
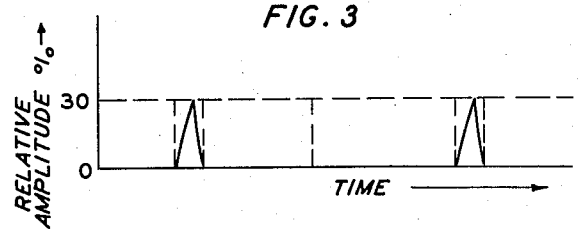
Fig. 3 is a graphical representation of the output pulse train in the comparator of Fig. 1 corresponding to the input pulse train of Fig. 2.

Illustrative representations of input pulses and output pulses in the comparator 16 are shown in Figs. 2 and 3 respectively for the case where the slider 38 is adjusted to select 70 percent of the maximum amplitude of the input pulse. By moving the slider 38 along the potentiometer 36 other percentages may be selected and the potentiometer may be calibrated in known manner to indicate the proper position of the slider for the desired percentage. The function of the comparator may be described as that of a proportional amplitude discriminator.

It is to be understood that the above-described arrangements are illustrative of the principles of the invention. Numerous other arrangements may be devised by those skilled in the art without departing from the spirit and scope of the invention.

What is claimed is:

A circuit comprising a pair of triode vacuum tubes, a potentiometer comprising an adjustable contacting arm and a resistive element, the element being shunted by a capacitor, the element and capacitor having an appreciable time constant and being connected between a first cathode and ground, a fixed resistor connecting the second cathode to ground, a second fixed resistor connecting both control electrodes to ground, a diode vacuum tube, the diode anode being connected to the second triode cathode, the diode cathode being connected to the adjustable contacting arm and to an output terminal whereby when a train of pulses is impressed across the second resistor to render the triodes conductive the capacitor will accumulate a charge continuously representative of the average amplitude of a number of the pulses last received and subsequent pulses will produce output pulses only if they exceed that portion of the average corresponding to the potentiometer setting.

References Cited in the file of this patent

UNITED STATES PATENTS

| | | |
|---|---|---|
| 2,129,027 | Roberts | Sept. 6, 1938 |
| 2,215,175 | Fewings | Sept. 17, 1940 |
| 2,279,819 | Fyler | Apr. 14, 1942 |
| 2,338,412 | Dallos | Jan. 4, 1944 |
| 2,519,890 | Crosby | Aug. 22, 1950 |
| 2,556,074 | Eberhard | June 5, 1951 |
| 2,561,182 | Crane | July 17, 1951 |
| 2,572,850 | Francis | Oct. 30, 1951 |
| 2,611,821 | Denton | Sept. 23, 1952 |
| 2,660,668 | Williams | Nov. 24, 1953 |
| 2,673,294 | Battell | Mar. 23, 1954 |
| 2,677,760 | Bess | May 4, 1954 |
| 2,715,181 | Glenn | Aug. 9, 1955 |
| 2,783,377 | Wofford | Feb. 26, 1957 |